(12) United States Patent
Snow et al.

(10) Patent No.: US 7,804,741 B1
(45) Date of Patent: Sep. 28, 2010

(54) SYSTEM AND METHOD FOR FOCUSING A KINETIC PULSE ARRAY

(75) Inventors: Trevor Snow, Bloomington, IN (US); Jeffrey M. Snow, Bloomington, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/570,960

(22) Filed: Sep. 30, 2009

Related U.S. Application Data (63) Continuation of application No. 12/568,452, filed on Sep. 28, 2009.

(51) Int. Cl.
*G01S 3/808* (2006.01)
(52) U.S. Cl. .................. 367/127; 367/138; 367/145
(58) Field of Classification Search .............. 367/127, 367/138, 145; 102/310
See application file for complete search history.

(56) References Cited

U.S. PATENT DOCUMENTS

| | | | |
|---|---|---|---|
| 2,706,011 A | 4/1955 | Bayhi | |
| 4,699,241 A | 10/1987 | Kerekes | |
| 4,976,199 A * | 12/1990 | Beukes et al. | 102/310 |
| 5,180,882 A | 1/1993 | Bansard | |
| 5,539,636 A | 7/1996 | Marsh et al. | |
| 5,808,969 A | 9/1998 | Arnaud et al. | |
| 6,941,870 B2 | 9/2005 | McClure et al. | |
| 7,051,636 B1 | 5/2006 | Snow et al. | |
| 7,406,918 B2 | 8/2008 | Brent et al. | |
| 7,453,392 B2 | 11/2008 | Thomas et al. | |
| 2007/0084376 A1 | 4/2007 | Lloyd | |
| 2008/0282925 A1 | 11/2008 | Lownds et al. | |

OTHER PUBLICATIONS

Leslie Gertsch and Jason Baird, A Phased Array Approach to Rock Blasting, final technical report, Aug. 7, 2006, University of Missouri-Rolla.

* cited by examiner

*Primary Examiner*—Dan Pihulic
(74) *Attorney, Agent, or Firm*—Christopher A. Monsey (57) ABSTRACT

The present disclosure relates to a method and system for finding and physically altering underground targets. Multiple nodes are dispersed into the ground and determine their spatial orientation using seismic waves, and then operate as an array to locate and properly time kinetic pulses to focus seismic waves on the target.

22 Claims, 12 Drawing Sheets

SYSTEM AND METHOD FOR FOCUSING A KINETIC PULSE ARRAY

CROSS REFERENCE TO RELATED APPLICATION

This application is a continuation of U.S. application Ser. No. 12/568,452, filed Sep. 28, 2009, the disclosure of which is expressly incorporated by reference herein. This application is related to U.S. patent application Ser. No. 12/570,954, filed Sep. 30, 2009, entitled "Locator System And Method Including Node And Target Acquisition" and U.S. patent application Ser. No. 12/570,965, filed Sep. 30, 2009, entitled "Projectile for Focusing a Kinetic Pulse Array", the disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used, licensed by or for the United States Government for any governmental purpose without payment of any royalties thereon.

BACKGROUND AND SUMMARY

The present disclosure relates generally to transmitting synchronized kinetic pulses to a target. More particularly, the disclosure relates to a system and method for physically altering an underground target using synchronized timing of kinetic pulses to focus seismic waves on the target.

Deeply buried objects, such as underground structures and mineral and gas deposits, are often difficult to locate. Many technologies exist for identifying, physically altering, and/or creating imaging of underground objects or voids. For example, nodes equipped with transducers may be placed above or below the ground surface to generate seismic waves and measure reflections from density and/or stiffness changes. Explosive nodes may also be positioned in the ground to physically alter an underground target. However, the accuracy and effectiveness of such technologies is often limited by the penetration depth of the nodes or by errors in positioning the nodes near the underground target.

According to an illustrative embodiment of the present disclosure, a system for focusing a kinetic pulse array on a target includes a plurality of nodes positioned near the target. Each node includes at least one transducer configured to communicate signals with at least one other node, and a pulse generator configured to generate a kinetic pulse having a pressure front. A controller is in communication with each node and is configured to determine a spatial arrangement of the plurality of nodes based on the communicated signals, the controller selectively controlling the generation of the kinetic pulse from each node based on the spatial arrangement of the nodes and a calculated location of the target to create a kinetic pulse array focused on the target.

According to another illustrative embodiment of the present disclosure, a method of focusing a kinetic pulse array on a target includes the steps of providing a plurality of nodes, each node including a transducer configured to communicate a signal with at least one other node and a pulse generator configured to generate a kinetic pulse having a pressure front, positioning the plurality of nodes near the target, communicating signals between the plurality of nodes, determining a spatial arrangement of the plurality of nodes based on the communicating step, selectively controlling the generation of the kinetic pulse from each node based on the spatial arrangement to create a kinetic pulse array, and focusing the kinetic pulse array on the target.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Corresponding reference characters indicate corresponding parts throughout the several views. Although the drawings represent embodiments of various features and components according to the present invention, the drawings are not necessarily to scale and certain features may be exaggerated in order to better illustrate and explain the present invention. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Figure 1:
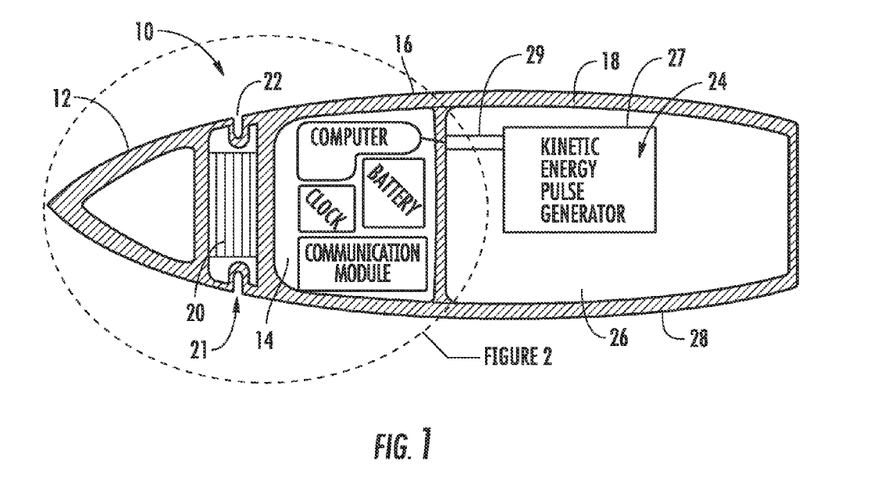
FIG. 1 is a cross-sectional view of an illustrative projectile of the present disclosure.
Figure 2:
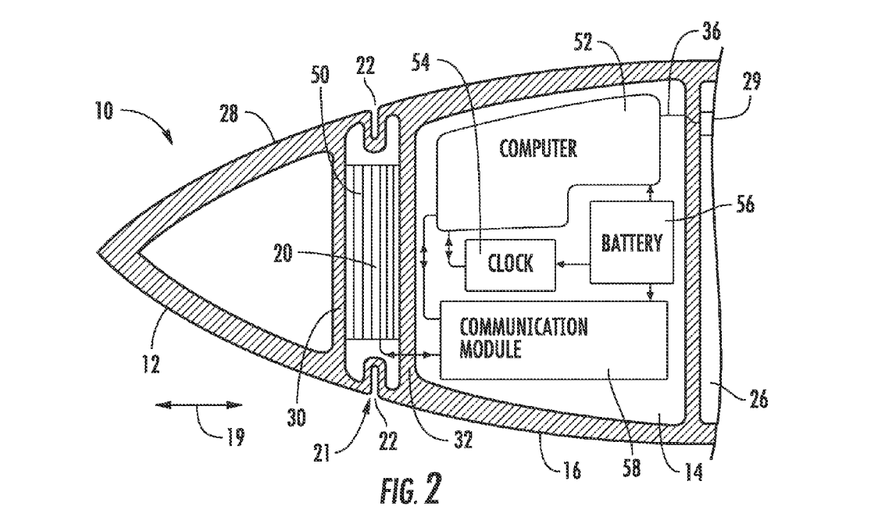
FIG. 2 is a detailed cross-sectional view of the projectile of FIG. 1.

Referring initially to FIGS. 1 and 2, an illustrative projectile 10 is shown for use as a node 160 (FIG. 8) with a system of the present disclosure. In the illustrated embodiment, projectile 10 includes a housing or shell 18 having a nose portion 12, a body portion 16, and an outer surface 28. The shell 18 is illustratively formed of a rugged, durable material, such as steel, and is configured for air borne delivery. For example, the projectile 10 may be launched in the air by artillery, mortar, or grenade launcher. The projectile 10 may also be part of a missile or a bomb dropped from an aircraft. Nose portion 12 illustratively tapers to a point to facilitate ground penetration, although nose portion 12 may be any suitable shape.

As further shown in FIGS. 1 and 2, body portion 16 of shell 18 illustratively defines a first cavity 14 and a second cavity 26 for housing and protecting various components. In the illustrated embodiment, a processor or computer 52, a clock 54, a battery 56, and a communication module 58 are positioned within first cavity 14, and a kinetic energy pulse generator 24 is positioned within second cavity 26. Suitable cushioning, such as foam or air bags, may be provided within the cavities 14 and 26 to protect the components received therein from shock due to launch setback or ground impact. Kinetic energy pulse generator 24 may be any device which generates a pulse of kinetic energy, such as a loudspeaker, an explosive, a sonar projector, etc. In one illustrative embodiment, the pulse generator 24 comprises an explosive 27 operably coupled to a detonator 29 which, in turn, is operably coupled to computer 52. Shell 18 may alternatively define any number of cavities and house additional components and/or pulse generators. In certain illustrative embodiments, the projectile 10 may include multiple sets of cavities 14 and 26 separated by frangible portions of shell 18 that are configured to breakaway during impact, thereby defining multiple nodes 160 per single projectile 10 for additional directional sensing capability.

A transducer 20 housed in shell 18 is illustratively positioned between nose portion 12 and body portion 16 and near a transmission coupling 21 of projectile 10. As shown in FIG. 2, transducer 20 is mounted between a first wall 30 of nose portion 12 and a second wall 32 of body portion 16 of shell 18. Transducer 20 is illustratively rugged to withstand forces or impact absorbed by projectile 10. Transducer 20 may be any type of electronic, electromagnetic, electromechanical, or electroacoustic transducer. In the illustrated embodiment, transducer 20 is a sonic or acoustic transducer, or hydrophone, configured to transmit and receive acoustic signals or pulses. Transducer 20 is illustratively capable of substantially omni-directional broadcasting (in azimuth and in elevation), but the directionality of transducer 20 may also be unidirectional or bi-directional. In the shown embodiment, transducer 20 includes an active element 50 for transmitting and receiving acoustic signals (e.g., mechanical vibration through the nose portion 12).

The transmission coupling 21 may comprise a bellows 22 positioned between nose portion 12 and body portion 16 (FIG. 2). As further detailed herein, bellows 22 is substantially flexible and is configured to allow the transducer 20 to move the nose portion 12 relative to the body portion 16 (axial direction as shown by arrow 19 in FIG. 2). The bellows 22 is configured to compress during impact and thereby transmit impact force to the body portion 16 of the projectile 10 and reduce the load the transducer 20 must endure.

Figure 3A:
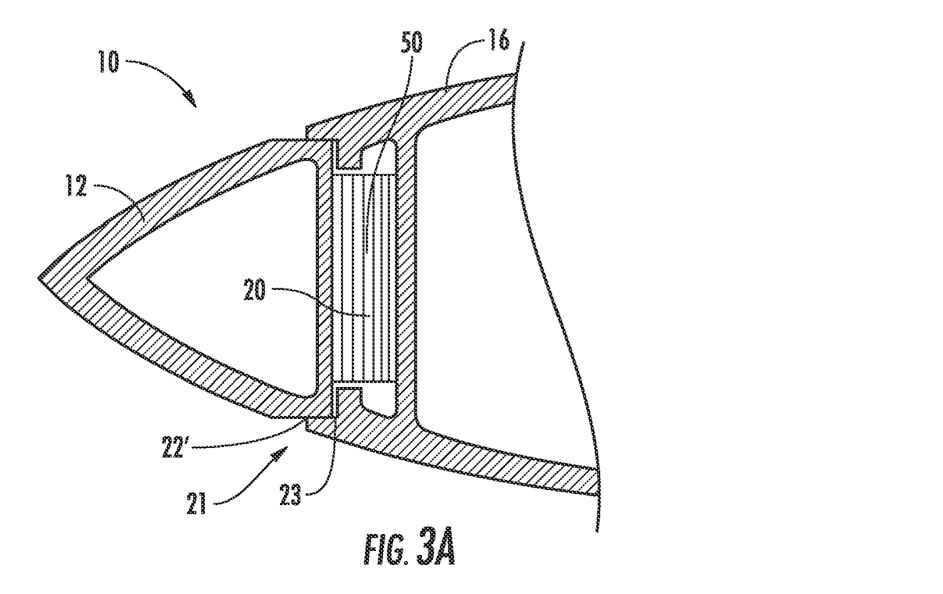
FIG. 3A is a detailed cross-sectional view of an illustrative transmission member between the nose portion and the body portion of the projectile.
Figure 3B:
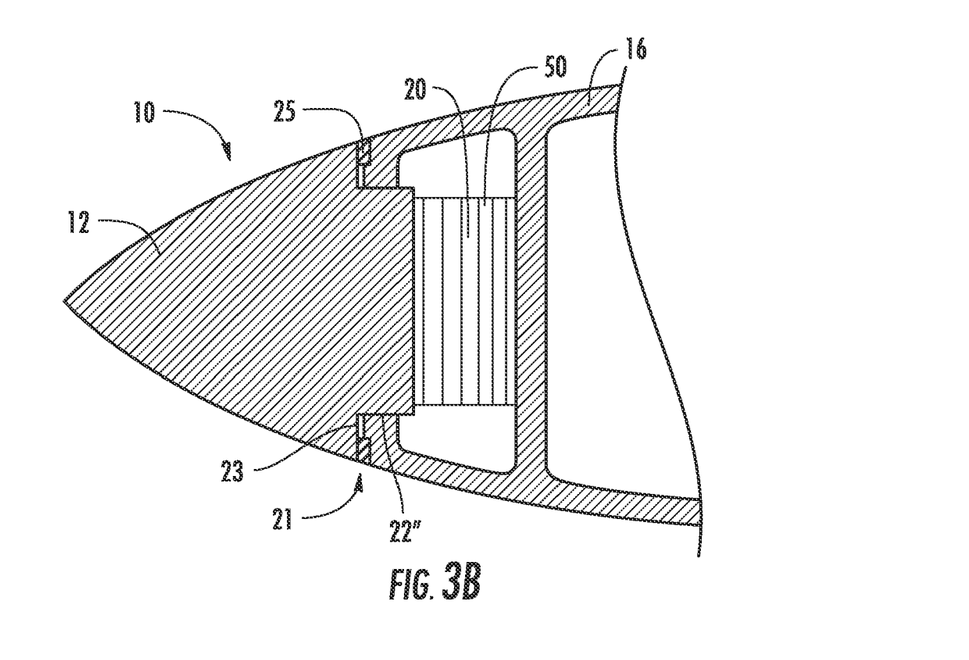
FIG. 3B is a detailed cross-sectional view similar to FIG. 3A of another illustrative transmission member.

FIGS. 3A and 3B show further illustrative transmission couplings 21 in the form of sliding joints. As shown in FIG. 3A, the sliding joint 22' defines a gap 23 configured to close during impact or launch to transfer load between the nose portion 12 and the body portion 16, and configured to open during operation of the transducer 20. As shown in FIG. 3B, an elastomeric filler 25 may be positioned within an outer portion of the sliding joint 22" and is configured to close gap 23 and exclude soil from penetrating the shell 18 during impact with the ground.

In a further illustrative embodiment, a shock absorber (not shown) separate from the transmission coupling 21 may be used to absorb impact from a collision between projectile 10 and another object or medium, such as the ground. In other words, the shock absorber may allow for additional relative movement and restoring force of the nose portion 12 of the shell 18 upon impact.

Figure 8:
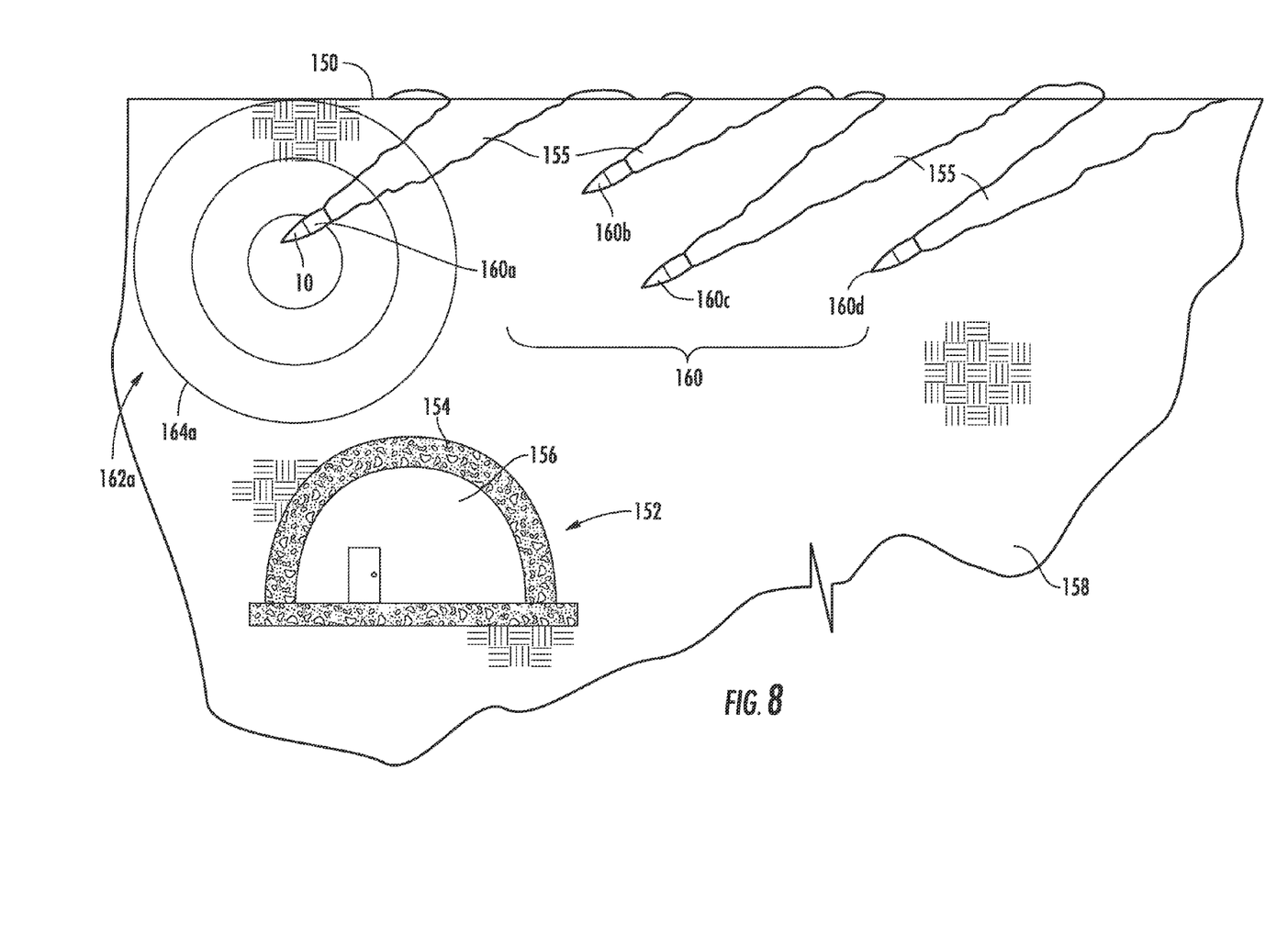
FIG. 8 is a schematic view of an illustrative system of the present disclosure, showing multiple projectiles positioned within an underground environment and with a first projectile transmitting an interrogation signal.
Figure 9:
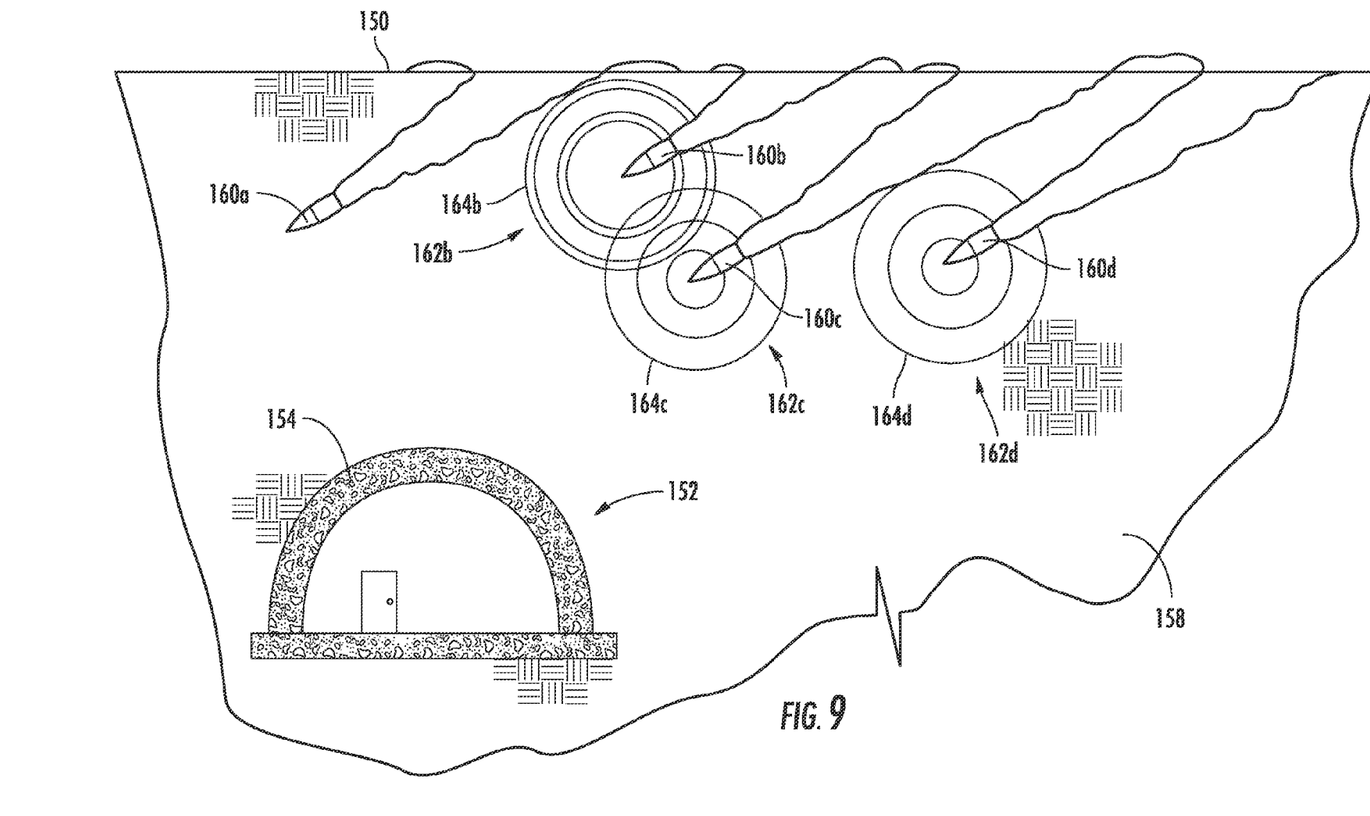
FIG. 9 is a schematic view similar to FIG. 8, showing response signals from multiple projectiles in response to the interrogation signal.

Illustratively, the transducer 20 comprises a piezoelectric or seismic transducer configured to convert electrical energy to acoustic energy (through mechanical vibration), and vice versa. As shown in FIGS. 2-3B, an illustrative transducer 20 includes an active element 50 such as a piezoelectric cell configured to convert an acoustic signal (e.g. mechanical vibration) into an electrical signal, and to convert an electrical signal into an acoustic signal (e.g. mechanical vibration). Active element 50 may be made of piezoelectric ceramic, crystal, or magnetostrictive material. Active element 50 is illustratively positioned near outer surface 28 of shell 18 to define a seismic coupling for transferring acoustic signals therethrough and into the ground 158 (FIG. 8). In another illustrative embodiment, projectile 10 includes a plurality of transducers 20 including a first transducer for transmitting or radiating signals and a second transducer for receiving signals.

Figure 4:
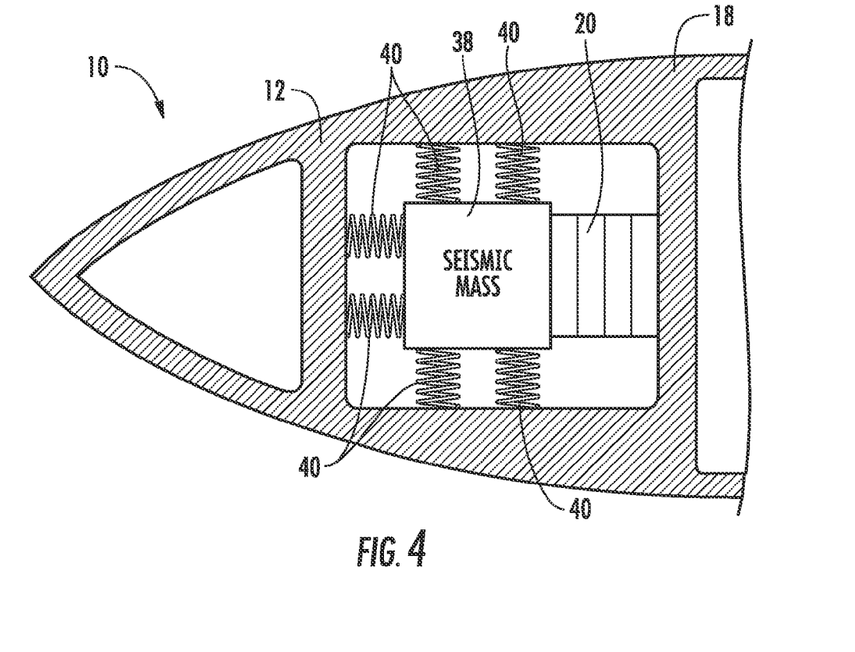
FIG. 4 is a detailed cross-sectional view of an illustrative transducer coupled to a seismic mass within the projectile.

In the illustrative embodiment of FIG. 4, the transducer 20 may be coupled to a seismic mass 38 within the nose portion 12 so that the entire projectile 10 moves in response to movement of the mass 38 by the transducer 20. Such an arrangement eliminates the need for a transmission member 21 on the shell 18. A plurality of resilient members, such as springs 40, limits movement of the seismic mass 38 and provides a restoring force. In certain illustrative embodiments, the springs 40 may be replaced with additional transducers 20.

Figure 5:
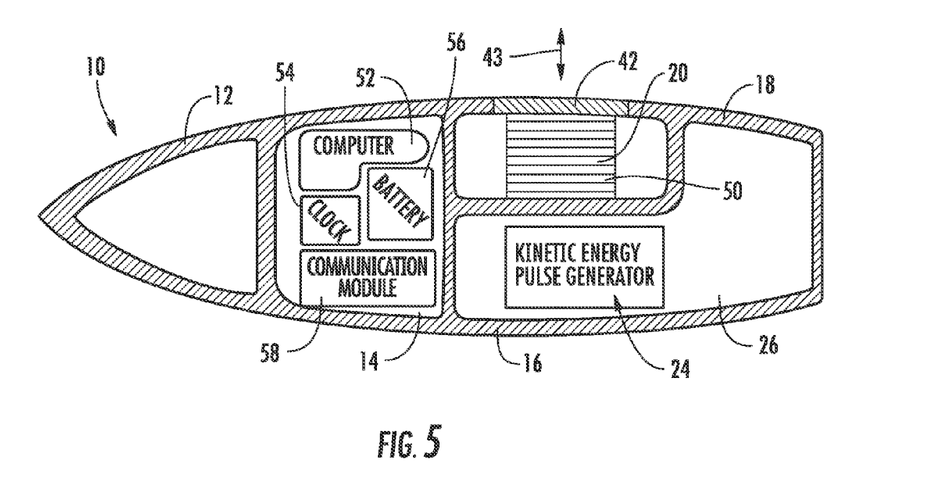
FIG. 5 is a detailed cross-sectional view similar to FIG. 1, showing an illustrative coupling arrangement of the transducer.

The transducer 20 is configured to vibrate and cause acoustic or seismic waves to propagate though the ground 158. As noted above, transmission member 21 is configured to permit movement of the transducer 20 relative to the shell 18. As shown in FIG. 5, a side portion 42 of the shell 18 may be coupled to the transducer 20 for relative traverse movement therewith relative to the remainder of the body portion 16 (see arrow 43). As such, the side portion 42 defines an acoustical or seismic coupling to the ground 158.

Figure 6:
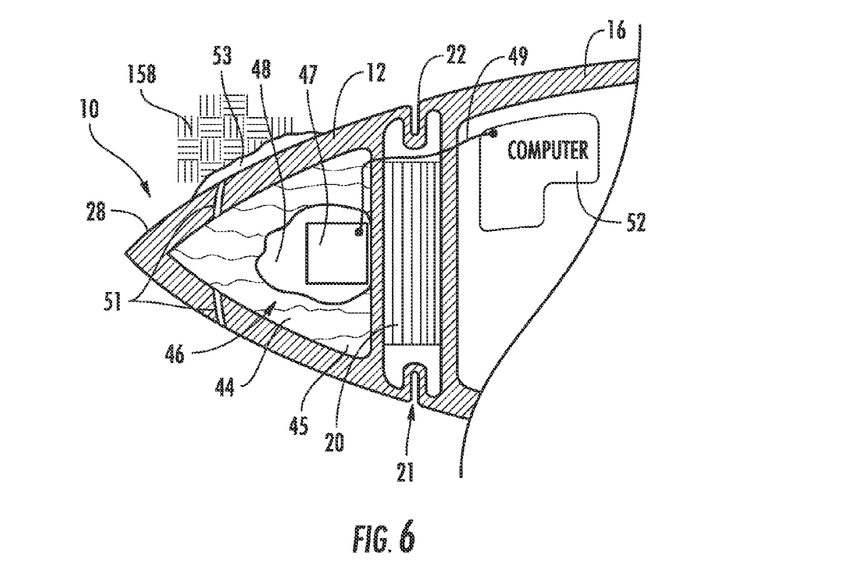
FIG. 6 is a detailed cross-sectional view of an illustrative coupling fluid received within the nose portion of the projectile.

In another illustrative embodiment shown in FIG. 6, a coupling fluid 44, such as a gel, is received within the nose portion 12 of the projectile 10. The coupling fluid 44 is received within a storage chamber 45 defined by the nose portion 12. A discharge device 46, illustratively a gas generator 47 fluidly coupled to an expandable bladder 48, is likewise received within the storage chamber 45. The computer 52 is operably coupled to the gas generator 47, illustratively through a cable 49, and is configured to cause activation thereof after the projectile 10 has been embedded in the ground 158. Following inflation of the bladder 48 by the gas generator 47, the coupling fluid 44 passes out of the shell 18 through weep holes 51 and fills voids 53 between the outside surface 28 of the nose portion 12 and the ground 158. As such, the coupling fluid 44 facilitates an effective seismic coupling between the transducer 20 and the ground 158 thereby enhancing the transmission of seismic waves.

With further reference to FIG. 2, computer or processor 52 communicates with pulse generator 24 via communication link 36. Computer 52 is configured to send control signals to pulse generator 24 to trigger the generation of a kinetic pulse. In the illustrated embodiment, computer 52 sends a trigger signal to pulse generator 24 to cause generation of a kinetic energy pulse. In one illustrative embodiment, the trigger signal causes detonator 29 to initiate (i.e. detonate) explosive 27. Computer 52 is further electrically connected to clock 54 and communication module 58. Communication module 58 facilitates communication between computer 52 and transducer 20. Computer 52, via communication module 58, provides control of transducer 20, including the control of the transmission and reception of acoustic signals by transducer 20. During a transmit mode, the communication module 58 converts digital signals from the computer 52 to required analog voltages and/or currents to move the transducer 20 the desired amount (i.e., digital to analog (D to A) conversion). Similarly, in a receive mode, the communication module 58 samples analog voltages and/or currents from the transducer 20 at the required rate and converts the samples to digital signals which are then sent to the computer 52 (i.e., analog to digital (A to D) conversion).

Computer 52 is further configured to perform various calculations and algorithms through machine readable software stored in memory (not shown). Clock 54 provides synchronization of the timing of communication between computer 52, communication module 58, and pulse generator 24. Battery 56 provides power to computer 52, clock 54, and communication module 58. Battery 56 is illustratively of the type configured to meet the rugged and short-term high power needs of the projectiles 10, such as lithium, thermal, or alkaline.

As noted above, a plurality of projectiles 10 may define an array of nodes 160, as used in the system of the present disclosure shown in FIGS. 8-13 and as further described herein. More particularly, in the illustrative embodiment each of the nodes 160 is defined by a projectile 10 of FIGS. 1-2. However, it should be appreciated that the nodes 160 may be supported by other suitable housings or casings rather than by the shells 18 of projectiles 10.

Although four nodes or projectiles (160a, 160b, 160c, 160d) are shown in FIGS. 8-13, any number of nodes 160 greater than one may be used with the illustrative system. The nodes 160 illustratively communicate by each transmitting its own unique seismic waveform (e.g., multiple frequencies or pulse coding). As used herein seismic waves include acoustic signals or sonic pulses (e.g. mechanical vibration) transmitted through the ground 158. In the illustrative embodiment, nodes 160 communicate with each other using digitally coded sonic pulses, which are transmitted and received by transducer 20. For example, node 160a is configured to transmit a digitally coded sonic pulse which is received by at least one of nodes 160b, 160c, and 160d. In one embodiment, nodes 160 utilize the digital modulation scheme of phase shift keying (PSK) or frequency shift keying (FSK), both well known in the art. However, any other functional digital modulation scheme may be used. By digitally coding the transmitted signals, nodes 160 are capable of uniquely identifying each of the other projectiles 160 based on the received digitally coded sonic pulse.

Still referring to FIGS. 8-13, a target 152 is illustratively located below a surface 150 of the ground 158. Target 152, illustratively a hollow structure such as an underground storage unit, includes an outer wall 154 and an interior cavity 156. Target 152 may be any underground structure, such as a shelter for mining sites, material or food storage structures, living quarters, tunnels, mine shafts, storage tanks, etc. Target 152 may provide shelter and protection to any objects, food, or persons located inside. Target 152 may also be underground objects, illustratively material mass or stiffness changes or inconsistencies within the soil, such as minerals, utilities, or underground noise sources.

Figure 7:
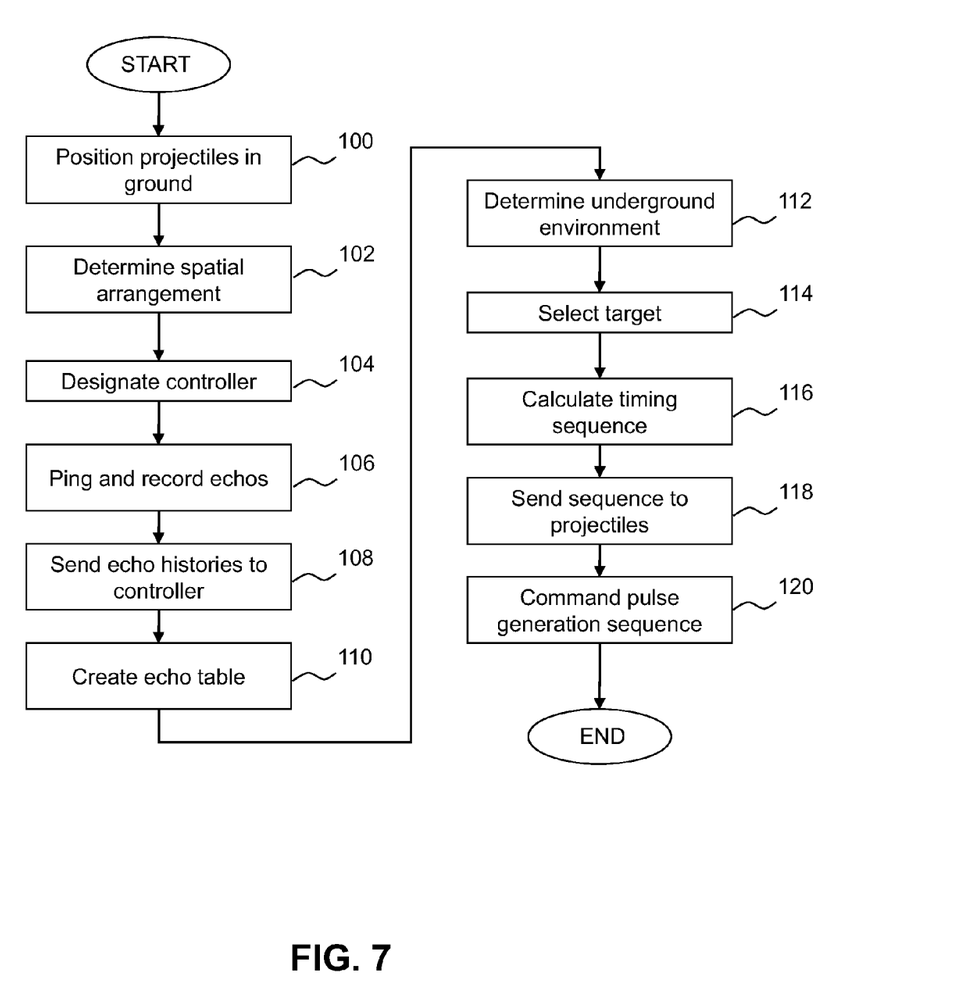
FIG. 7 is a flow chart showing an illustrative method of operation of a system of the present disclosure.

Reference is made to the flowchart of FIG. 7 throughout the following description of FIGS. 8-13. As represented by block 100 of FIG. 7, nodes 160 are first positioned in the ground 158 near target 152, as shown in FIG. 8. Nodes 160 illustratively use kinetic energy to penetrate a distance into the ground 158 below surface 150. For example, nodes 160 in the form of projectiles 10 may be launched from a remote location and, with assistance of an on-board or remote guidance system driving a propulsion device (not shown), impact a location on the surface 150 of the ground 158 at a certain velocity. Greater velocity, and hence greater kinetic energy, of projectiles 10 at impact provides a greater penetration or burrowing depth into the ground 158. A trail of disturbed soil or hole 155 is created by each ground-penetrating projectile 10.

In certain instances, a burrowing device (not shown) may be supported by the nose portion 12 of the projectile 10 to facilitate ground penetration. For example, a propulsion device, such as a rocket, may be used to increase the velocity of the projectile 10 at impact to facilitate deeper penetration into the ground 158. Further, a guidance system including movable aerodynamic fins driven in response to global positioning system (GPS) inputs to the computer 52 may be utilized to improve precise spacing of impact locations of the projectiles 10 and resulting performance. Laser designation may also be utilized to facilitate desired impact locations of the projectiles 10.

In yet other illustrative embodiments, the projectile 10 may employ speed brakes (not shown). For example, an airbag may be provided within the nose portion 12 of the projectile 10 that is inflated upon impact (to keep at least a portion of the projectile 10 above the ground surface 150) or at a desired depth after impact (to bring burrowing of the projectile 10 to a halt). The airbag could also be deployed from the rear cavity 26 in a shape that permits pressure on side walls of the hole formed by passage of the projectile 10. In yet other illustrative embodiments, a parachute may be deployed rearwardly from the rear cavity 26 to retard speed of the projectile 10 prior to impact. Various sensors, including an accelerometer (which may be defined by the transducer 20) may be used to control activation of the speed brakes.

In further illustrative embodiments, nodes 160 may be placed into pre-drilled holes 155 in the ground 158 in which a burrowing devices (not shown), such as a moles or augers supported by the nodes 160, pre-drills the holes 155. In such embodiments, the burrowing device may form part of each node 160 for self-drilling of the holes 155 in the ground 158. The burrowing device may also comprise a shovel or posthole digger for forming the holes 155 in the ground 158 prior to placement of the nodes 160.

With nodes 160 positioned in the ground 158, the transducer 20, and specifically active element 50, of each node 160 is seismically coupled with the ground 158 by being near or substantially in contact with the soil medium. As a result, signal bounce between the soil of the ground 158 and transducer 20 is substantially reduced or eliminated during the communication of signals.

As represented by block 102 of FIG. 7, nodes 160 determine the spatial arrangement or relative positions of the array of nodes 160 after the nodes 160 have been positioned in the ground 158. As shown in the illustrated embodiment of FIG. 8, transducer 20 of node 160*a* transmits a digitally coded interrogation signal pulse or ping 162*a* having a pressure or pulse front (i.e., seismic wave) 164*a* in a substantially omni-directional pattern. Alternatively, transducers 20 of node 160*a* may transmit multiple interrogation signal pulses 162*a* in a directional pattern. Initiation of the interrogation signal pulse 162*a* may occur after a default time following impact of the projectile 10 with the ground surface 150, thereby allowing time for the remaining projectiles 10 to be launched and embed within the ground 158. A sudden load on the transducer 20 may be used to sense impact and provide a signal representative thereof to the computer 52. Alternatively, a separate accelerometer may be coupled to the shell 18 to provide an impact signal to the controller. Upon detection of interrogation signal pulse 162*a*, transducer nodes 160*b*, 160*c*, 160*d* transmit a digitally coded signal in response, represented by response signal pulses or pings 162*b*, 162*c*, 162*d* in FIG. 9. Response signal pulses 162*b*, 162*c*, 162*d* include pressure or pulse fronts 164*b*, 164*c*, 164*d*, respectively.

Figure 10:
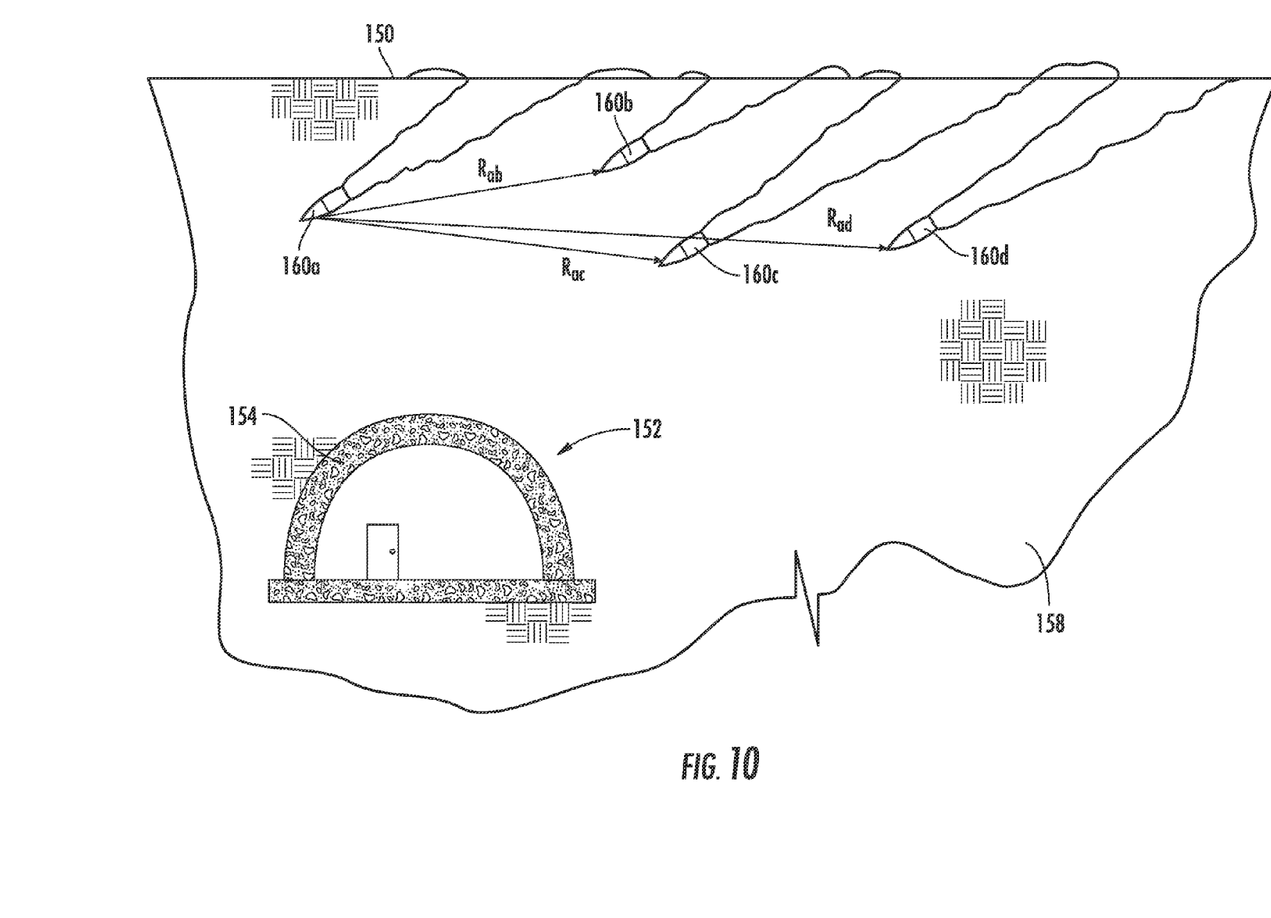
FIG. 10 is a schematic view similar to FIG. 8, showing distances from the first projectile to the other projectiles as calculated by a controller.

Node 160*a* receives response signal pulses 162*b*, 162*c*, 162*d* and identifies the node 160*b*, 160*c*, 160*d* associated with each unique digitally coded pulse 162*b*, 162*c*, 162*d*. By calculating each time delay between the transmission of interrogation pulse 162*a* and the receipt of response pulses 162*b*, 162*c*, 162*d*, node 160*a* determines its distance from projectiles 160*b*, 160*c*, 160*d*. As shown in FIG. 10, computer 52 of node 160*a* ascertains distances $R_{ab}$, $R_{ac}$, $R_{ad}$ based on the time delay between the transmission of pulse 162*a* and the receipt of pulses 162*b*, 162*c*, 162*d*, respectively. Distance $R_{ab}$ is the distance between nodes 160*a* and 160*b*, distance $R_{ac}$ is the distance between nodes 160*a* and 160*c*, and distance $R_{ad}$ is the distance between nodes 160*a* and 160*d*. This process of block 102 repeats for nodes 160*b*, 160*c*, 160*d* until each node 160 has determined its distance relative to the other nodes 160 in the array. The distances calculated by each node 160 are illustratively communicated to the other nodes 160. Each node 160*a*, 160*b*, 160*c*, 160*d* may determine the spatial arrangement, or the three-dimensional coordinates, of the array of nodes 160 based on the calculated distances. Alternatively, at least one of the nodes 160 determines the spatial arrangement and transmits the calculated spatial arrangement to the other nodes 160 in the array through coded signals from transducer 20.

Figure 11:
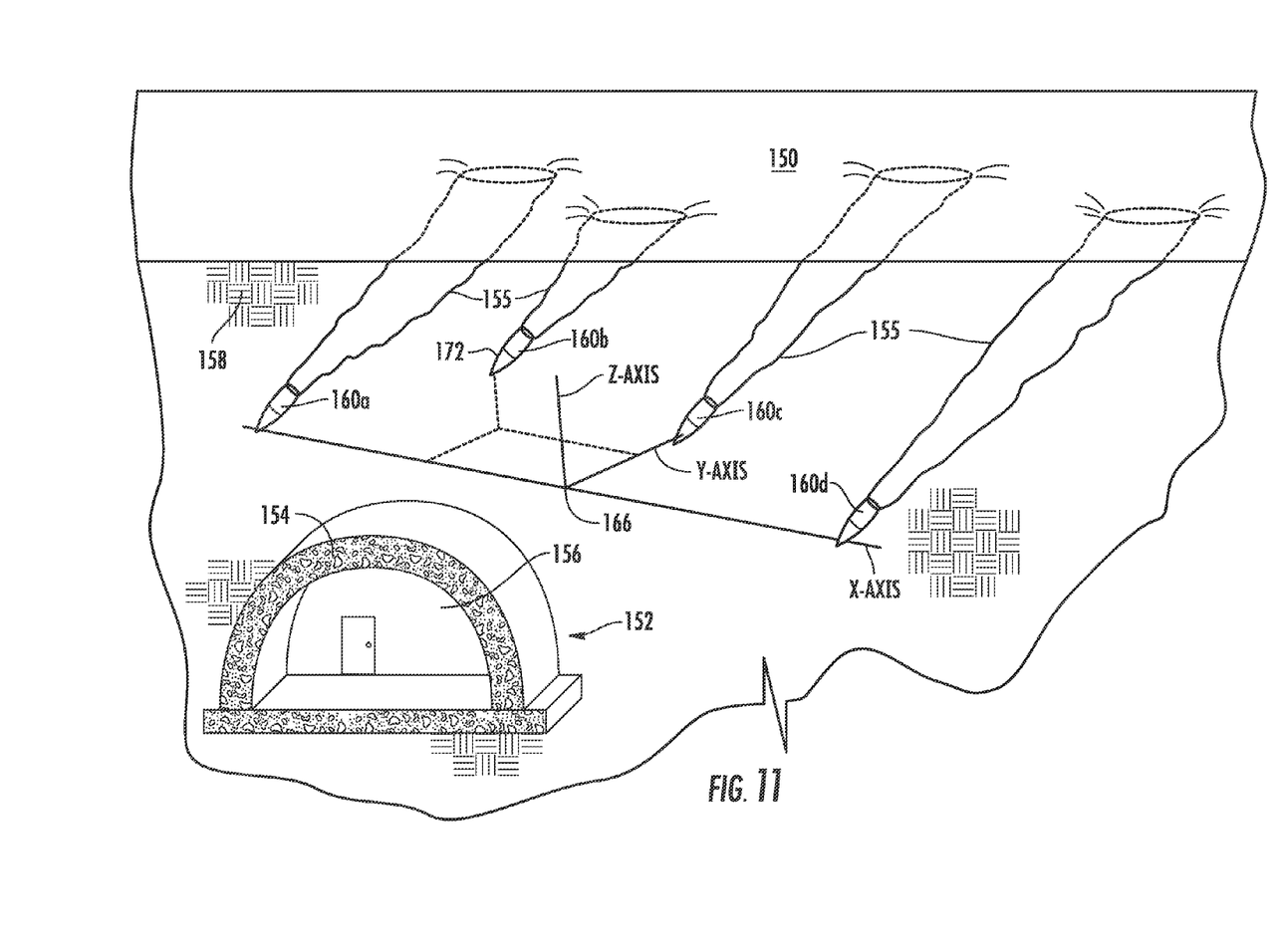
FIG. 11 is a perspective view in partial schematic similar to FIG. 8, showing the arrangement of the orthogonal reference coordinate system.

In the illustrative embodiment shown in FIG. 11, there are at least four spatially independent nodes 160*a*, 160*b*, 160*c*, 160*d* to establish a three dimensional reference coordinate system 166 (for nodes 160 that transmit and receive in an omni-directional fashion). Spatially independent is defined as meaning that two nodes 160 are not immediately adjacent to each other (i.e., too close to establish a clear reference axis therebetween), three nodes 160 cannot be in the same line, and all four nodes 160 cannot be in the same plane. If these conditions are not met, then slight errors in calculated distances between nodes 160 may cause different (and inaccurate) orientations of the reference coordinate system 166. Accuracy of the reference coordinate system 166 is determined by the distance errors and the degree of spatial independence of the nodes 160. More nodes 160 will improve the accuracy due to redundancy and averaging of errors.

The reference coordinate system 166 is set by defining a primary x-axis as a line between the nodes 160 with the greatest separation. In FIG. 11, nodes 160*a* and 160*d* have the greatest separation. Next, the primary x-y plane is defined as a plane that contains the x-axis and the next farthest node 160 from the x-axis. In FIG. 11, node 160*c* is farthest from the x-axis. By knowing the x-axis and the x-y plane, the y-axis is defined. The z-axis is then defined as normal to the x-y plane and positive in the direction of the next farthest node 160 from the x-y plane. In FIG. 11, node 160*b* is the next farthest from the x-y plane. The origin of the coordinate system 166 may be set as (0,0,0) at the intersection of the x, y, and z axes. In one illustrative embodiment, the origin may be set at (0,0,0) on one of the nodes 160 on the x-axis. The positions of the nodes 160 may then be calculated by the computer 52 in terms of the x, y, and z axes of the reference coordinate system 166.

Orientation of the reference coordinate system 166 relative to the ground surface 150 may be determined in a manner similar to the method utilized to locate target 152, only by searching for a large, relatively flat reflective surface. Location of the coordinate system 166 may be accomplished via a node 160 placed on the ground surface 150 with global positioning system (GPS) capability for relaying location information to the computer 52.

In one embodiment, nodes 160 may communicate via an ad-hoc network where each node 160 is configured to forward information or data for other nodes 160 in the array. As such, each node 160 need not communicate with each of the other nodes 160 in the array in order to determine the spatial arrangement or perform other functions. The "outlier" nodes 160 which are at a greater distance from the other nodes 160 in the array may communicate with only one other node 160. For example, if node 160*a* of FIG. 8 cannot communicate with node 160*d*, node 160*b* could relay or forward information transmitted from node 160*a* to node 160*d*.

After determining the spatial arrangement of nodes 160, one of nodes 160 nominates itself as the controller 172 for the array, as represented by block 104 in FIG. 7. The controller 172 may coordinate the communication between the nodes 160, the detection of objects and structures in the ground, and the determination of the surrounding environment. The centermost node 160 illustratively nominates itself as the controller 172, although any node 160 may self-nominate. In the illustrated embodiment shown in FIGS. 11 and 12, node 160*b* is shown as nominating itself as the controller 172. As such, computer 52 of node 160*b* becomes the master computer or controller 172 for the array of nodes 160. After self-nominating itself, controller 172 verifies that no other node 160 in the array has also self-nominated itself as the controller 172. Controller 172 transmits a signal to the other nodes 160*a*, 160*c*, 160*d* in the array, and any other self-nominating node 160 communicates with controller 172 to eliminate potentially conflicting controllers 172 and resolve to one controller 172 for the array.

More particularly, conflict between self-nominating controllers 172 could be resolved by comparing signal strengths between the nodes 160, wherein each self-nominating controller 172 would send the strength of its weakest signal to another node 160. The node 160 with the stronger of the weakest signals would become the controller 172. Other methods for resolving conflicts between self-nominating controllers 172 could also be used, including node identification. In one example, the highest serial numbered node 160 may be the controller 172.

Time synchronization or coordination is achieved following nomination of the controller 172. Illustratively, the controller 172 sends a time request signal to each projectile 10 which, in turn, responds with the time of its respective clock 54. The controller 172 knows the relative distance to each node 160 and therefore the signal delay time. By knowing the signal delay times and the clock times of the other nodes 160, the controller 172 may calculate the difference between its master clock time and the clock time of the other nodes 160. The controller 172 may account for the relative clock time differences between nodes 160 when instructing the other nodes to activate their respective pulse generators 24. Alternatively, the controller 172 may provide a delay time after the command detonation signal to each node 160. The delay times or clock differences may also be used to send a transmit pulse from the entire set of nodes 160 (array) in a desired direction.

As shown by block 106 of FIG. 7, nodes 160 initiate an acoustical signal pulse or ping sequence by pinging and recording received echoes in order to determine the surrounding environment, such as to detect the location and characteristics of objects, structures, layers of strata, etc. Upon command by controller 172, each node 160 sequentially transmits an acoustical signal pulse or ping in an omni-directional pattern. In one illustrative embodiment, controller 172 first transmits a ping sequence to each node 160, and nodes 160 each transmit a signal pulse at a time according to the ping sequence. Nodes 160 may transmit signal pulses in any sequence or order as determined by controller 172. The signal pulse reflects off of changes in material density or stiffness as the signal pulse propagates through the ground 158. For example, the signal pulse will reflect off of a change in strata or any object or structure having a different density than the surrounding soil, such as a hollow cavity, concrete structure, rock layer, etc.

The acoustical signal pulses or pings transmitted by the nodes 160 may be suitable for pulse compression such as a linear frequency modulation (LFM) pulse. This is a known technique used in radar and sonar applications to lower the peak power of a pulse and spread the energy over time. Upon receipt, the pulse is passed through a matched filter (could be hardware or software) that concentrates the energy and delivers a much higher signal to noise ratio, thereby improving the detectability of weak echos or reflections.

In the illustrative method of block 106, node 160a first sends out an omni-directional signal pulse, such as signal pulse 162a shown in FIG. 8. Each node 160a, 160b, 160c, 160d records any reflections received from signal pulse 162a reflecting off of changes in density in the surrounding environment. Nodes 160a, 160b, 160c, 160d calculate the magnitude of each received reflection and the time delay between the transmission of signal pulse 162a and the receipt of the reflection. Each node 160a, 160b, 160c, 160d stores the calculated reflection data in a data table, or echo history. Next, node 160b, illustratively controller 172, transmits an omni-directional signal pulse, such as signal pulse 162b shown in FIG. 9, and each node 160a, 160b, 160c, 160d records the time delay and magnitude of any received reflections in the data table. The process of block 106 repeats for nodes 160c and 160d. Although the signal pulse is illustratively omni-directional, nodes 160 may alternatively transmit a directional or bi-directional signal pulse in a plurality of directions to cover the entire surrounding area.

After nodes 160 complete the ping sequence of block 106, nodes 160 each send the calculated echo histories containing the reflection magnitude and time delay data to controller 172, as represented by block 108 of FIG. 7. Nodes 160 may alternatively send the echo histories to controller 172 at any time during the ping sequence of block 106, such as after each projectile transmits a signal pulse. Nodes 160 illustratively transmit the echo histories via coded acoustic signals, although other means of communication may be used.

As shown in block 110 of FIG. 7, controller 172 illustratively compiles all of the echo histories received by nodes 160 into a master echo table which is stored in memory. Controller 172 is configured to filter the data to eliminate false reads. Based on the reflection data in the master echo table and the calculated spatial arrangement of nodes 160, controller 172 determines the location of underground structures or objects in the surrounding environment, as represented by block 112. Controller 172 may also determine the approximate size and density of each identified structure or object as well as the location of surface 150.

As represented by block 114, controller 172 selects a target 152 from the objects and structures identified in the surrounding environment in block 112. Controller 172 illustratively selects the largest object as the target 152 or the object from which the strongest reflection was received by nodes 160. As shown in FIGS. 8-13, the selected target 152 is illustratively an underground storage unit. Controller 172 may also select a target based on pre-determined criteria. Target 152 may alternatively be a specified location and depth rather than an object or structure. In one embodiment, controller 172 is unable to select a target that matches the pre-determined criteria, and thus any further operation is altered or terminated.

Figure 12:
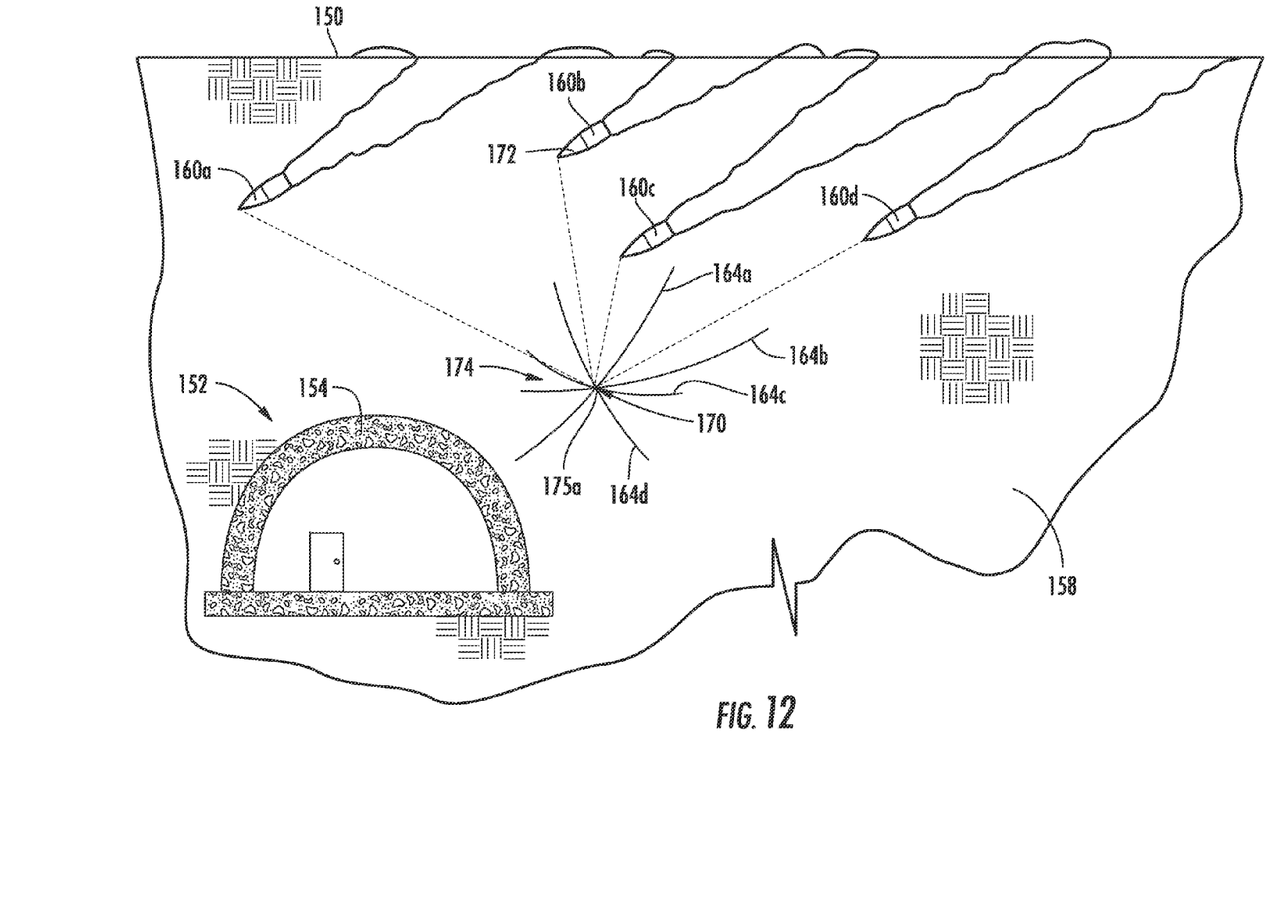
FIG. 12 is a schematic view similar to FIG. 8, showing a focal point of kinetic pulse wave fronts generated by the projectiles.
Figure 13:
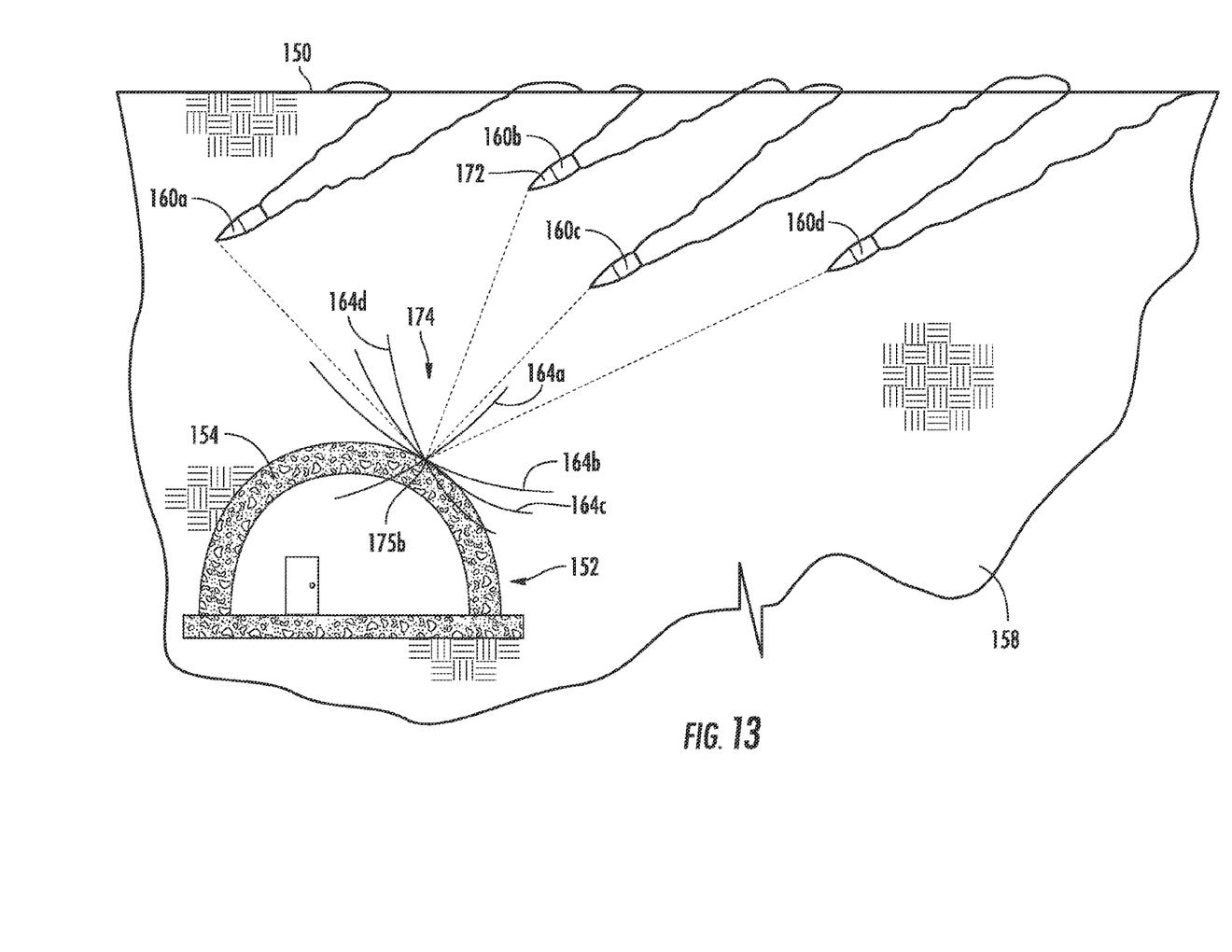
FIG. 13 is a schematic view similar to FIG. 8, showing the focal point of the kinetic pulse wave fronts sent by the controller at a calculated position of a target.

After selecting the target, controller 172 calculates a pulse generation timing sequence and sends the timing sequence to nodes 160, as represented by blocks 116 and 118 of FIG. 7. Nodes 160 illustratively confirm receipt of the timing sequence. If all nodes 160 do not send confirmation, controller 172 illustratively re-sends the timing sequence at least once before operation is altered or terminated. Controller 172 uses the timing sequence for selectively controlling the generation of a kinetic pulse or seismic wave from each node 160 to create a kinetic pulse, or seismic wave, array 174, such as shown in FIGS. 12 and 13. Controller 172 calculates the timing sequence based on the spatial arrangement of the nodes 160 and the location of target 152. By controlling the timing of the generation of kinetic pulses from nodes 160, a kinetic pulse array 174 can be formed having an array pressure front directed toward a particular target or focal point 175. Once nodes 160 have confirmed receipt of the timing sequence from controller 172, controller 172 commands the initiation of the pulse generation sequence, as represented by block 120 of FIG. 7.

As shown in FIG. 12, the pulse generator 24 of each node 160a, 160b, 160c, 160d generates a kinetic pulse or seismic wave having a pulse front 164a, 164b, 164c, 164d, respectively, upon command by controller 172. Alternatively, each transducer 20 of nodes 160 may generate a kinetic pulse to create the kinetic pulse array. The maximum energy of the resulting kinetic pulse array 174 is at the array pressure front 170, which is the focal point 175 where the pulse fronts 164a, 164b, 164c, 164d of the kinetic pulses intersect. In FIG. 12, kinetic pulse array 174 is illustratively directed away from target 152 to focal point 175a. For example, focal point 175a of FIG. 12 illustratively is the point where pulse fronts 164a, 164b, 164c, 164d intersect when the pulse generators of nodes 160a, 160b, 160c, 160d are all activated simultaneously. In FIG. 13, kinetic pulse array 174 is directed towards target 152, and the array pressure front 170 arrives at outer wall 154 of target 152 at focal point 175b. More particularly, given the calculated spatial arrangement of nodes 160a, 160b, 160c, 160d and target 152, the controller 172 coordinates the timing of activation of the pulse generators 24 such that the pulse fronts 164a, 164b, 164c, 164d arrive at focal point 175b. In the illustrative embodiment, the pulse generator 24 of nodes 160a, 160b, 160c, 160d includes explosive 27. By focusing the array pressure front 170 of kinetic pulse array 174 on target 152, a maximum destructive force will be imposed on target 152.

In one illustrative embodiment, transducers 20 of nodes 160 test the kinetic pulse generation sequence by transmitting a sonic pulse according to the timing sequence prior to the generation of the kinetic pulse array. As such, the accuracy of the kinetic pulse array may be confirmed and adjustments may be made prior to the initiation of the kinetic pulse generation sequence.

As detailed above, the kinetic pulse generator of each node 160 may comprise an explosive 27 coupled to a detonator 29 which is activated by the computer 52. In certain embodiments, a fuel air explosive (FAE) may be distributed above the ground surface 150 and substantially centered about the target 152. Multiple initiators (not shown) may be positioned on the ground surface 150 for coordinated activation by the controller 172. The initiators may be timed and/or controlled wirelessly (e.g. through RF) to detonate the FAE in concentrically decreasing rings that may send a focused shock wave downward toward the target 152.

Figure 14:
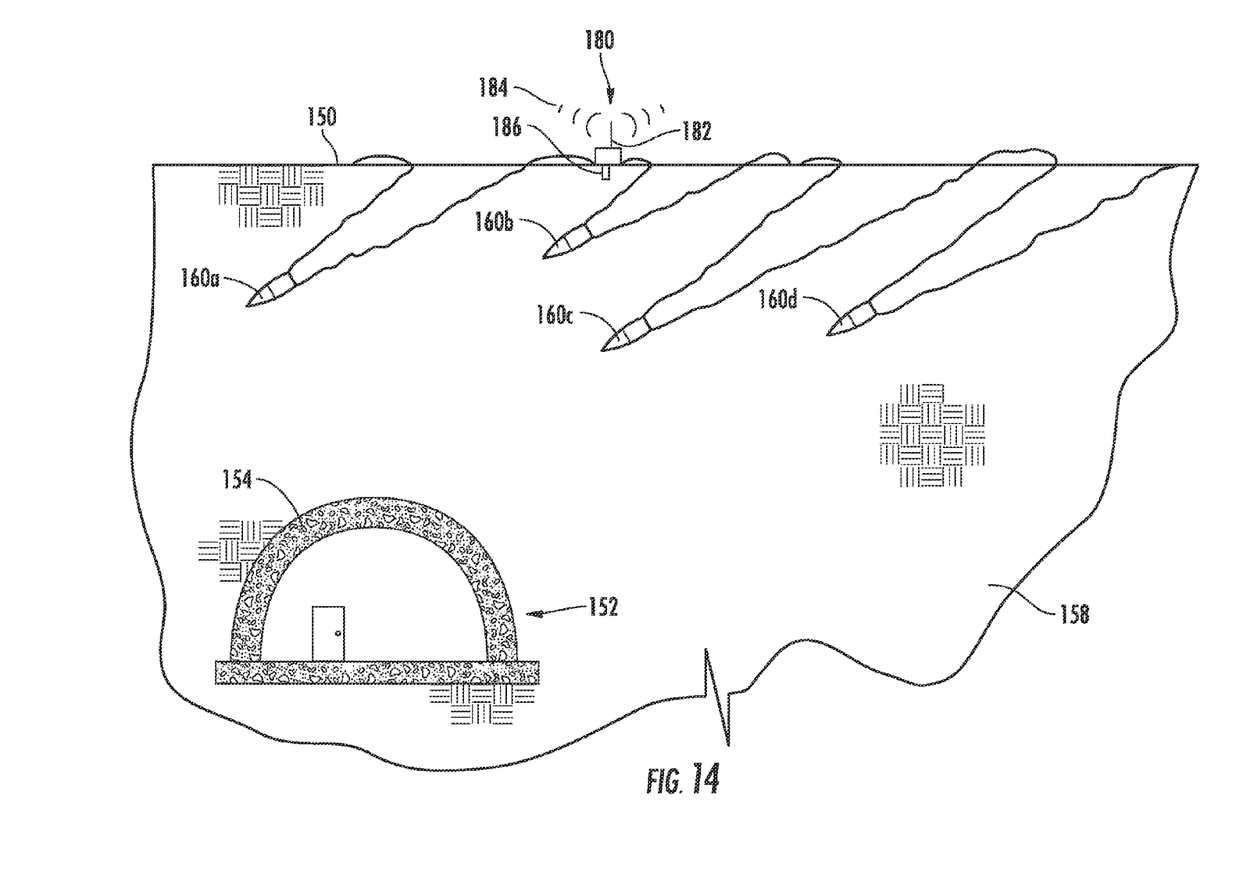
FIG. 14 is a schematic view of an illustrative system similar to FIGS. 8-13, showing a controller positioned at the ground surface.

In a further illustrative embodiment, as shown in FIG. 14, controller 180 is partially buried in the ground. Controller 180 having a transducer 186 is positioned at ground surface 150. Controller 180 is separate and remote from nodes 160, and communicates with nodes 160 via transducer 186, which is illustratively substantially in contact with the ground 158 to reduce signal bounce. Similar to controller 172 of FIGS. 12 and 13, controller 180 coordinates the communication between nodes 160, the detection of objects and structures in the ground 158, and the determination of the surrounding environment.

Controller 180 further illustratively includes an antenna 182 for communicating via signals or waves 186 with a remote or off-site control unit. In certain illustrative embodiments, the antenna 182 may be supported by the rear cavity of the projectile 10 in either a static form or a deployable form. Illustratively, the antenna 182 may be removably supported by the shell 18 such that upon impact with the ground 158, the antenna 182 physically separates from the projectile 10 while remaining in communication with the computer 52 either through a wired or wireless connection. In other illustrative embodiments, the projectiles 10 may be deployed in clusters with fiber optic lines coupled to each at a rear connection point and unwound from a coil during deployment. In another illustrative embodiment, controller 180 may be mounted to a movable support, such as an aircraft or ground vehicle, and communicates with nodes 160 from a remote location.

While the system of FIGS. 7-14 is described above for physically altering an underground target 152, the system may be used for a variety of other applications. In one further illustrative embodiment, the above described system may be used for mining applications or advanced cracking techniques, such as rock or concrete cracking. In another illustrative embodiment, the system may be used for mapping and creating images of underground objects or voids, determining an underground environment for down-hole drilling or mineral extraction, or scrambling or interfering with a noise source or electromagnetic source. In another illustrative embodiment, a microphone may be used to listen to and record sound waves from a certain direction. For example, sound waves from inside the target (e.g. underground structure) may be combined to increase gain and reduce interference such that audible activity within the target may be listened to and/or recorded. Microphones may also define a security perimeter device including an audible trigger (i.e. tripwire) to detect sound waves, for example from the movement of personnel, and/or vehicles, and/or aircraft in the vicinity of the array. In still another embodiment, the projectiles may be positioned under water.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A system for focusing a kinetic pulse array on a target including:
   a plurality of nodes positioned near the target, each node including
   at least one transducer configured to communicate signals with at least one other node, and
   a pulse generator configured to generate a kinetic pulse having a pressure front; and
   a controller in communication with each node configured to determine a spatial arrangement of the plurality of nodes based on the communicated signals, the controller selectively controlling the generation of the kinetic pulse from each node based on the spatial arrangement of the nodes and a calculated location of the target to create a kinetic pulse array focused on the target.

2. The system of claim 1, wherein the at least one transducer of each node transmits a first signal to the at least one other node and receives a second signal from the at least one other node, the spatial arrangement being determined based on a time delay between the first and second signals.

3. The system of claim 1, wherein each node further includes a computer in communication with the at least one transducer and the pulse generator, the controller being the computer of one of the plurality of nodes.

4. The system of claim 3, wherein the computer of each node is configured to determine the spatial arrangement of the plurality of nodes.

5. The system of claim 1, wherein the at least one transducer of each node is configured to transmit a signal pulse to the target and receive a reflection of each transmitted signal pulse from the target, the controller determining the location of the target based on a time delay between each transmitted signal pulse and the received reflection of each transmitted signal pulse.

6. The system of claim 1, wherein the controller calculates a pulse generation timing sequence and sends the timing sequence to each node, the kinetic pulse being generated by each node according to the timing sequence so that the pressure front of each kinetic pulse in the kinetic pulse array arrives at the target substantially simultaneously.

7. The system of claim 1, wherein each node further includes a clock for synchronizing the generation of the kinetic pulse with the timing sequence.

8. The system of claim 1, wherein the transducer and the pulse generator are one in the same.

9. The system of claim 1, wherein the pulse generator generates a kinetic pulse in an omni-directional pattern.

10. The system of claim 1, wherein the pulse generator is an explosive.

11. The system of claim 1, wherein the controller is positioned remote from the plurality of nodes.

12. The system of claim 1, wherein each at least one transducer is configured to transmit and receive acoustic pulses.

13. A method of focusing a kinetic pulse array on a target including the steps of:
provide a plurality of nodes, each node including a transducer configured to communicate a signal with at least one other node and a pulse generator configured to generate a kinetic pulse having a pressure front;
positioning the plurality of nodes near the target;
communicating signals between the plurality of nodes;
determining a spatial arrangement of the plurality of nodes based on the communicating step;
selectively controlling the generation of the kinetic pulse from each node based on the spatial arrangement to create a kinetic pulse array; and
focusing the kinetic pulse array on the target.

14. The method of claim 13, wherein the controlling step is further based on a calculated location of the target.

15. The method of claim 14, further including the steps of transmitting a signal from each node in a plurality of directions, receiving a reflection of the transmitted signal at each node, and determining the location of the target relative to the plurality of nodes based on the spatial arrangement and the reflections received by each node.

16. The method of claim 15, further including the step of nominating a controller for controlling the plurality of nodes, the controller being one of the plurality of nodes.

17. The method of claim 16, wherein the selectively controlling step comprises the controller determining a pulse generation timing sequence based on the spatial arrangement and the pre-determined location of the target and sending the timing sequence to the plurality of nodes, the kinetic pulse being generated by each node according to the timing sequence.

18. The method of claim 17, wherein the focusing step comprises causing the pressure front of each kinetic pulse in the kinetic pulse array to arrive at the target substantially simultaneously.

19. The method of claim 13, wherein the transducer and the pulse generator are combined.

20. The method of claim 13, further comprising the step of positioning the nodes within the ground.

21. The method of claim 20, further comprising the steps of airborne deployment of the nodes, and burrowing the nodes within the ground.

22. The method of claim 13, wherein the step of communicating signals comprises transmitting acoustical pulses.

* * * * *